Jan. 5, 1971     H. E. CRIBB     3,553,586
VALIDATION DEVICE FOR SPACECRAFT CHECKOUT EQUIPMENT
Filed April 9, 1968     2 Sheets-Sheet 1
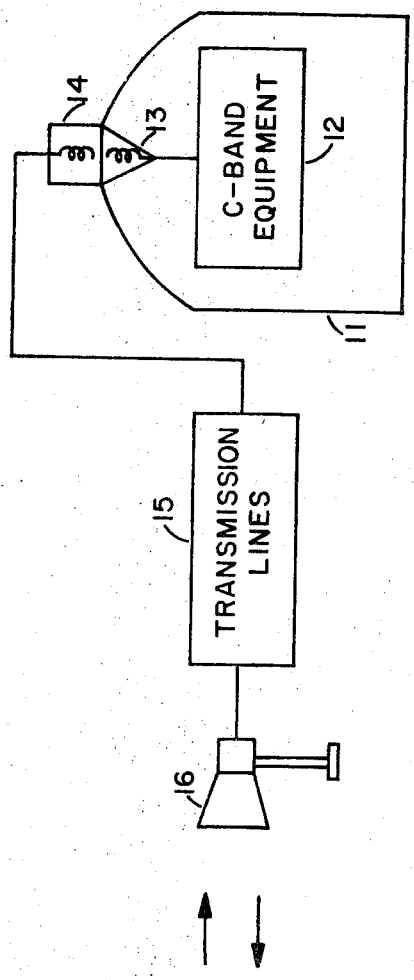
FIG. 1
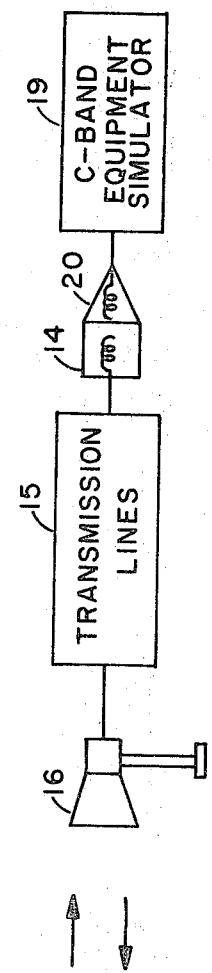
FIG. 2
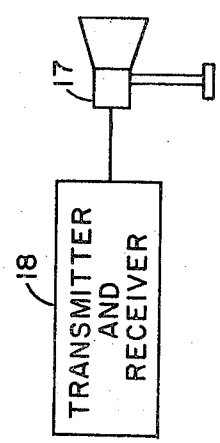
INVENTOR.
HERBERT E. CRIBB
BY
ATTORNEYS INVENTOR.
HERBERT E. CRIBB
BY
John E. Coy
William H. King
ATTORNEYS United States Patent Office 3,553,586
Patented Jan. 5, 1971

3,553,586
VALIDATION DEVICE FOR SPACECRAFT CHECKOUT EQUIPMENT
Herbert E. Cribb, Satellite Beach, Fla., assignor to the United States of America as represented by the Administrator of the National Aeronautics and Space Administration
Filed Apr. 9, 1968, Ser. No. 719,870
Int. Cl. H04b 7/18
U.S. Cl. 325—67                7 Claims

ABSTRACT OF THE DISCLOSURE

A device for validating the equipment used for checking out the C-band equipment on a spacecraft prior to flight. The device simulates the C-band equipment on the spacecraft. Hence, when the checkout equipment is connected to the device, it can be determined whether or not the checkout equipment is in proper working condition. Also the device provides means for making VSWR and attenuation measurements.

The invention described herein was made by an employee of the United States Government and may be manufactured and used by or for the Government for governmental purposes without the payment of any royalties thereon or therefor.

The invention relates generally to equipment for checking out a spacecraft prior to flight, and more specifically concerns a device for checking out launch pad parasitic antennas and transmission lines.

After a spacecraft is placed on its launch pad and prior to launch, all of its equipment is thoroughly checked out to insure that it is operating properly. To check out the equipment on the spacecraft, equipment outside the spacecraft such as parasitic antennas, transmission lines, and radar is required. It is obvious that this equipment located outside the spacecraft has to be validated by checking it out to make sure that it is functioning properly before it is used to check out the equipment on the spacecraft. It is the purpose of this invention to provide a device for validating the checkout equipment located outside the spacecraft. The preferred embodiment of the invention is a device for validating C-band checkout equipment; however, it is to be understood that different band devices could be built without departing from this invention.

In the past, the C-band launch pad parasitic antennas and transmission lines have been validated with eight individual pieces of equipment. This equipment is expensive and weighs approximately 400 pounds. Hence, it is difficult to transport this equipment from one location to another. It is, therefore, the primary object of this invention to provide an inexpensive, portable device for validating the C-band launch pad antennas and transmission lines used to check out a spacecraft.

Another object of this invention is to provide a device that simulates the C-band equipment on a spacecraft for the purpose of validating the C-band launch pad antennas and transmission lines.

A further object of this invention is to provide a device that will quickly and accurately measure the VSWR of launch pad antennas and transmission lines.

Still another object of this invention is to provide a device that will quickly and accurately measure the attenuation of launch pad transmission lines.

Other objects and advantages of the device which constitutes this invention will become apparent hereinafter and in the drawings in which:

FIGS. 1 and 2 are drawings used to describe the purpose of the invention; and

Figure 3:
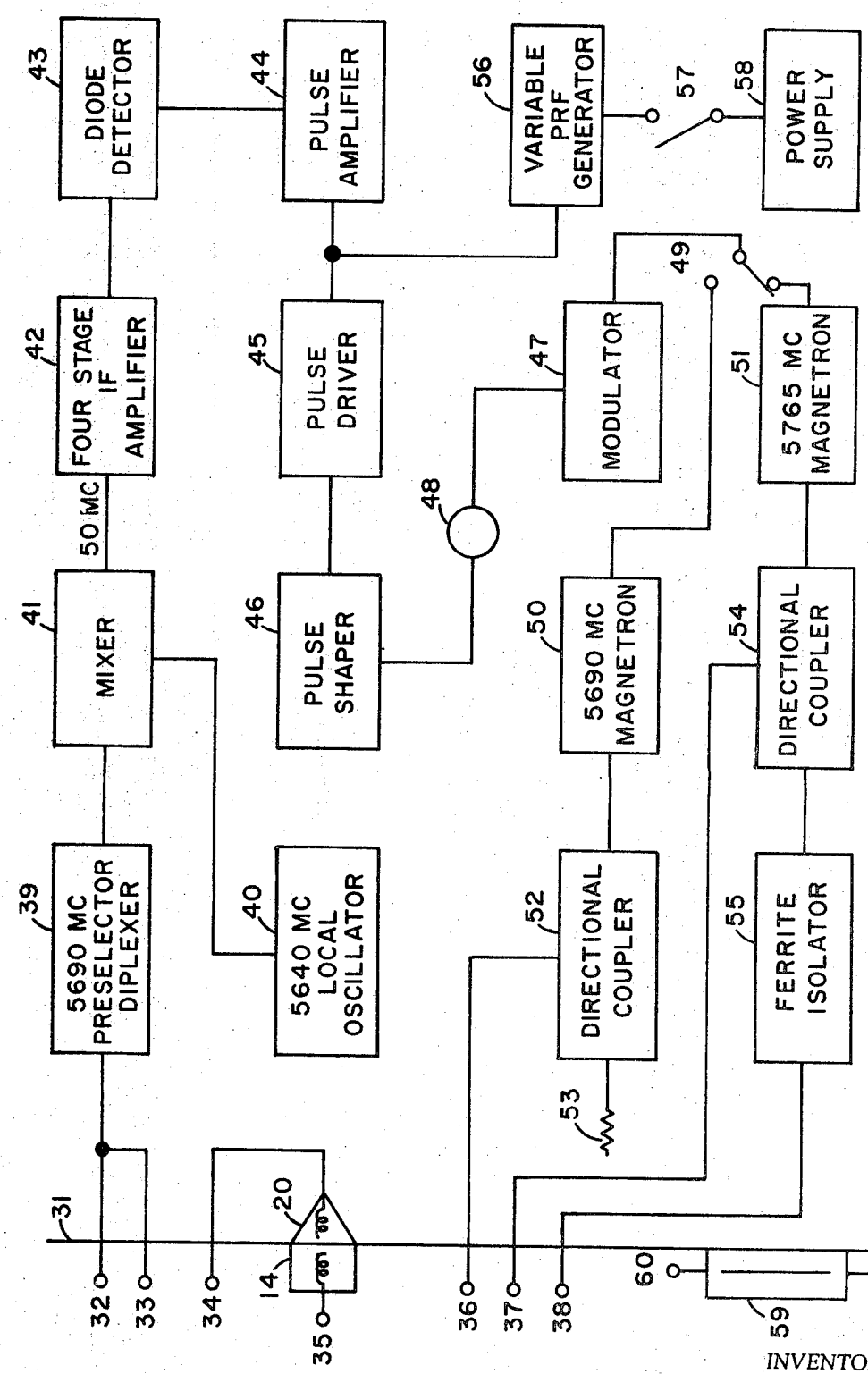
FIG. 3 is a block diagram of the preferred embodiment of the invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Referring now to FIG. 1, there is shown a block diagram of a setup for checking out the C-band equipment on a spacecraft while it is on its launch pad. The number 11 designates the spacecraft and the block 12 represents the C-band equipment located on the spacecraft. The C-band equipment 12 is connected to an antenna 13 located inside the spacecraft for transmitting and receiving. Located outside the spacecraft and in close proximity to antenna 13 is an antenna 14 which is coupled to antenna 13. Antenna 14 is connected through transmission lines 15 to a directional antenna 16. This antenna transmits and receives signals from a directional antenna 17 which is connected to a transmitter and receiver 18. Transmission lines 15, antenna 14, and directional antenna 16 are all located in the general vicinity of the spacecraft 11, and transmitter and receiver 18 and directional antenna 17 are located remote to spacecraft 11.

To check out the C-band equipment 12, pulses are modulated at a frequency in the C-band by transmitter 18 and then applied to directional antenna 17. These C-band signals are emanated into space and picked up by directional antenna 16. These signals are then applied through transmission lines 15 to antenna 14. The signals emanated by antenna 14 are picked up by antenna 13 and applied to the C-band equipment 12. Upon the reception of signals at the first frequency, the C-band equipment 12 generates signals at a second frequency in the C-band. These second frequency signals are applied back through antenna 13, antenna 14, transmission lines 15, antenna 16, antenna 17, to receiver 18. The signals received by receiver 18 are indicative of the operation of C-band equipment 12. If no signals are received by receiver 18, then obviously the C-band equipment 12 is not operating properly, or if the signals received by receiver 18 are distorted, there is a malfunction of the C-band equipment 12. If the signals received by receiver 18 are the ones that are expected, then antenna 13 and C-band equipment 12 are functioning properly.

In checking out the C-band equipment by the means shown in FIG. 1, it is assumed that all antennas, transmission lines, and other equipment located outside the spacecraft is in proper operating condition. However, this assumption cannot be made until the equipment has been checked out to assure that it is operating properly. Consequently, prior to the time that spacecraft 11 is put on its launch pad, an antenna 20 and a C-band equipment simulator 19 are substituted for antenna 13 and C-band equipment 12 as shown in FIG. 2. Antenna 20 is made as nearly identical to antenna 13 as possible and the C-band equipment simulator 19 simulates the functions of the C-band equipment 12. In FIG. 2, the tests are run the same as they are in FIG. 1. Hence, when signals are transmitted by transmitter 18 through the system, they are reflected back and received by receiver 18. If the signals received are the ones expected for a properly operating system, it is then known that the equipment located outside of the spacecraft 11 is in proper operating condition. The present invention is the C-band equipment simulator 19 which, in addition to simulating C-band equipment 12, performs other useful functions in checking out the equipment located outside the spacecraft.

Turning now to the preferred embodiment of the invention selected for illustration in FIG. 3, the number 31 designates a terminal board having terminals 32 through 38. Terminals 32 and 33 are connected together and to a 5690 mc. preselector diplexer 39. This diplexer is an RF filter tuned to a center frequency of 5690 mc. The output from diplexer 39 is mixed with a 5640 mc. signal from a local oscillator 40 in a mixer 41. The resulting 50 mc. difference signal at the output of mixer 41 is amplified by a four-stage IF amplifier 42. This amplified signal is applied to a diode detector 43 where the pulses are detected and then amplified by a pulse amplifier 44 and a pulse driver 45. The amplified pulses from driver 45 are shaped and applied as triggers to modulator 47. An ammeter 48 calibrated to indicate frequency is connected between shaper 46 and modulator 47. Each time modulator 47 is triggered by a pulse from the pulse shaper, it applies a .7 of a microsecond pulse of high negative voltage through a switch 49 to either a 5690 mc. magnetron 50 or a 5765 mc. magnetron 51. The modulated output of magnetron 50 is applied through a directional coupler 52 to a dummy load 53 and to terminal 36. The modulated output of magnetron 51 is applied through a directional coupler 54 to a ferrite oscillator 55 and to terminal 37. The output of ferrite oscillator 54 is connected to terminal 38. A PRF generator 56 which has an output frequency that can be varied from 600 to 2,000 pulses per second is applied to the input of driver 45. Generator 56 is connected to its power supply 58 by a switch 57. Antenna 14 is attached to terminal board 31 and connected to terminal 35. Antenna 21 is attached to the opposite side of terminal board 31 in close proximity with antenna 14 and is connected to terminal 32. A slotted line 59 with terminals 60 and 61 is attached to terminal board 31.

In the mode of operation of this invention, as described in FIG. 2, switch 49 is switched to its 5765 mc. position as shown and switch 57 is switched to its "Off" position as shown. Terminals 33 and 38 are connected together by a jumper, and terminals 32 and 34 are connected together by a jumper. Transmitter 18 produces a 5690 mc. signal which is emitted by antenna 17 and picked up by antenna 17. This signal is applied through transmission lines 15 to antenna 14 where it is emitted and then picked up by antenna 20. The signal picked up by antenna 20 is applied through terminals 34 and 32 to preselector diplexer 39. The output of diplexer 39 is mixed with the signal from oscillator 40 by mixer 41 to produce a 50 mc. difference signal. This difference signal is applied through four-stage IF amplifier 42 to a diode detector 43. The pulses in the signal are detected by detector 43 and then amplified by pulse amplifier 44 and pulse driver 45. The pulses are then shaped by pulse shaper 46 and applied to modulator 47. Each time modulator 47 is triggered by a pulse from the shaper, the modulator applies a .7 of a microsecond pulse of high negative voltage to the 5765 magnetron 51 causing it to produce a burst of RF energy at a frequency of 5765 mc. The signals produced at the output of magnetron 51 are transmitted through directional coupler 54 and ferrite isolator 55 to terminal 38. These signals then pass through terminals 33, 32, and 34 to antenna 20 where they are emitted and then picked up by antenna 14. The signals picked up by antenna 14 pass through transmission lines 15, antennas 16 and 17, to receiver 18. Hence, it can be seen that pulses are modulated and transmitted from transmitter 18 at a frequency of 5690 mc, through antennas 17 and 16, transmission lines 15, antennas 14 and 20 to C-band equipment simulator 19. The pulses are detected in the simulator, remodulated at 5765 mc. and transmitted back to receiver 18. The pulses received by transmitter 18 are compared with the pulses transmitted by transmitter 18. If there is no distortion in the received pulses, then it is known that the equipment including transmission 15 and antennas 16, 17, and 14 are in good working condition. Meter 48 gives an indication as to whether or not pulses are being received by the simulator.

A range radar is usually used as transmitter and receiver 18. However, at times a range radar is not available. In those instances when a range radar is not available, C-band equipment simulator 19 can be operated automatically without receiving signals from transmitter 18. In this automatic mode of operation, switch 49 is switched to its 5765 mc. position as shown, switch 57 is switched to its "On" position, a jumper is used to connect terminal 38 to terminal 33, and a jumper is used to connect terminal 32 to terminal 34. The frequency of generator 56 is adjusted until meter 48 reads 1,000 pulses per second. These pulses are modulated at 5765 mc. by modulator 47 and magnetron 51, and then applied through directional coupler 54 and terminals 38, 33, 32, and 34 to antenna 20. The signals emitted by antenna 20 are picked up by antenna 14 and pass through transmission lines 15, antennas 16 and 17 to a suitable receiver 18. Hence, in the automatic mode of operating the equipment located outside the spacecraft 11 in FIG. 1 can be checked out in the setup in FIG. 2 without the use of a transmitter 18.

The device disclosed in FIG. 3 also provides means for measuring the VSWR (voltage standing wave ratio) of transmission lines 15 and antenna 16 for either 5675 mc. or 5690 mc. These measurements are required to validate the checkout system. To measure the VSWR at 5690 mc., switch 49 is switched to its 5690 mc. position, switch 57 is switched "On," generator 56 is adjusted until meter 48 reads 1,000 pulses per second, a jumper is used to connect terminal 36 to terminal 60 and transmission lines 15 are connected to terminal 61. The cable from a probe detector is connected to a VSWR meter and the VSWR measurements are made. To make the 5765 VSWR measurements, switch 49 is switched to its 5765 mc. position and the jumper is used to connect terminal 37 to terminal 60.

Attenuation measurements are also required of the device in FIG. 3. For attenuation measurements at 5690 mc., switch 49 is switched to its 5690 mc. position, switch 57 is switched "On," the output of generator 56 is adjusted so that meter 48 reads 1,000 pulses per second, terminal 36 is connected to a thermistor (not shown), and the cable from the thermistor is connected to a power meter which makes the attenuation measurements. To measure attenuation at 5765 mc., switch 49 is switched to its 5765 mc. position and terminal 37, instead of terminal 36, is connected to the thermistor.

The invention has another mode of operation which is called the survey mode. This mode is used for the purpose of the selection of a location for antenna or antennas 16. In this mode of operation, terminal 38 is connected to an antenna (not shown) mounted on top of the housing for this invention. The antenna can be rotated in both azimuth and elevation. The invention is then carried to different locations with generator 56 turned "On." When receiver 18 receives a maximum amplitude signal, then it is known that that location is a good location for an antenna 16. The azimuth and the elevation can be varied to determine the azimuth and elevation setting for antenna 16.

The advantages of the device that constitutes this invention are numerous. It is a compact, light, inexpensive device for validating the equipment used for checking out the C-band equipment on a spacecraft prior to flight. It provides means for answering interrogations sent out by a transmitter at a remote location. It provides means for automatically sending signals to a receiver at the remote location and it provides means for easily making necessary VSWR and attenuation measurements of launch pad antennas and transmission lines.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention defined in the subjoined claims. The different components shown as blocks in FIG. 3 are all well-known components and, therefore, are not disclosed in detail in this specification. Equivalent components could be substituted for each of these components without departing from the invention.

What is claimed is:

1. A device for validating the operability of equipment used to check out a spacecraft comprising:
   (A) an antenna for communicating with said equipment;
   (B) a detecting means connected to said antenna for detecting a first signal at a high frequency being transmitted by said equipment and converting said first signal to a second signal at an intermediate frequency; wherein said detecting means includes:
       (1) a preselector diplexer connected to said antenna;
       (2) a mixer connected to said preselector diplexer;
       (3) an oscillator connected to said mixer;
       (4) a four-stage IF amplifier connected to said mixer; and
       (5) a diode detector connected to said four-stage IF amplifier.
   (C) an amplifying and shaping means connected to said detecting means for amplifying and shaping said second signal;
   (D) a modulating means connected to said amplifying and shaping means for modulating said second signal;
   (E) a transmitting means connected to said modulating means for receiving said modulated second signal and triggering a third signal for transmission through said antenna to said equipment;

2. A device for validating the operability of equipment used to check out a spacecraft comprising:
   (A) an antenna for communicating with said equipment;
   (B) a detecting means connected to said antenna for detecting a first signal at a high frequency being transmitted by said equipment and converting said first signal to a second signal at an intermediate frequency;
   (C) an amplifying and shaping means connected to said detecting means for amplifying and shaping said second signal; wherein said amplifying and shaping means includes:
       (1) a pulse amplifier connected to said detecting means;
       (2) a pulse driver connected to said pulse amplifier; and
       (3) a pulse shaper connected to said pulse driver;
   (D) a modulating means connected to said amplifying and shaping means for modulating said second signal;
   (E) a transmitting means connected to said modulating means for receiving said modulated second signal and triggering a third signal for transmission through said antenna to said equipment.

3. A device as defined in claim 2 further including:
   (A) a variable frequency generator connected to said pulse driver;
   (B) a power supply for said variable frequency generator; and
   (C) a switch for connecting said power supply to said variable frequency generator when said detecting means does not detect said first signal from said equipment.

4. A device for validating the operability of equipment used to check out a spacecraft comprising:
   (A) an antenna for communicating with said equipment;
   (B) a detecting means connected to said antenna for detecting a first signal at a high frequency being transmitted by said equipment and converting said first signal to a second signal at an intermediate frequency;
   (C) an amplifying and shaping means connected to said detecting means for amplifying and shaping said second signal;
   (D) a modulating means connected to said amplifying and shaping means for modulating said second signal;
   (E) a transmitting means connected to said modulating means for receiving said modulated second signal and triggering a third signal for transmission through said antenna to said equipment;
   (F) means for selective connection to said modulating means to make VSWR measurements of said equipment.

5. A device as defined in claim 4 wherein said means for making VSWR measurements of said equipment includes:
   (A) a magnetron at a preset frequency;
   (B) a switch for connecting said magnetron to said modulating means;
   (C) a directional coupler connected to said magnetron; and
   (D) means connecting said directional coupler to said antenna.

6. A device for validating the operability of equipment used to check out a spacecraft comprising:
   (A) an antenna for communicating with said equipment;
   (B) a detecting means connected to said antenna for detecting a first signal at a high frequency being transmitted by said equipment and converting said first signal to a second signal at an intermediate frequency;
   (C) an amplifying and shaping means connected to said detecting means for amplifying and shaping said second signal;
   (D) a modulating means connected to said amplifying and shaping means for modulating said second signal;
   (E) a transmitting means connected to said modulating means for receiving said modulated second signal and triggering a third signal for transmission through said antenna to said equipment; wherein said transmitting means includes:
       (1) a magnetron at a preset frequency connected to said modulating means;
       (2) a directional coupler connected to said magnetron;
       (3) a ferrite isolator connected to said directional coupler; and
       (4) means for connecting said ferrite isolator to said antenna.

7. A device as defined in claim 6 further including a detector probe connected to said directional coupler for making VSWR and attenuation measurements of said equipment.

References Cited
UNITED STATES PATENTS 3,314,067   4/1967   Rutz _____ 343—100

ROBERT L. GRIFFIN, Primary Examiner

K. W. WEINSTEIN, Assistant Examiner

U.S. Cl. X.R.

325—8; 343—17.7